United States Patent
Golde et al.

(10) Patent No.: US 10,225,357 B2
(45) Date of Patent: Mar. 5, 2019

(54) COMPACT DATA STRUCTURES FOR PUSH NOTIFICATIONS

(71) Applicant: Facebook, Inc., Menlo Park, CA (US)

(72) Inventors: Ittai M. Golde, Sunnyvale, CA (US); Benjamin H F Nham, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 658 days.

(21) Appl. No.: 14/939,285

(22) Filed: Nov. 12, 2015

(65) Prior Publication Data
US 2017/0142213 A1  May 18, 2017

(51) Int. Cl.
*G06F 17/30* (2006.01)
*H04L 29/08* (2006.01)
*G06F 8/61* (2018.01)
*G06F 9/445* (2018.01)

(52) U.S. Cl.
CPC ............... *H04L 67/26* (2013.01); *G06F 8/61* (2013.01); *G06F 9/44526* (2013.01); *G06F 17/30321* (2013.01); *G06F 17/30598* (2013.01); *G06F 17/30867* (2013.01)

(58) Field of Classification Search
CPC ..... G06F 17/30; G06F 17/30321; H04L 67/26
USPC .................................................. 707/600–899
See application file for complete search history.

(56) References Cited

U.S. PATENT DOCUMENTS

2013/0325573 A1* 12/2013 Park ................... G06Q 30/0241
705/14.16

* cited by examiner

*Primary Examiner* — Isaac M Woo
(74) *Attorney, Agent, or Firm* — FisherBroyles, LLP (57) ABSTRACT

The disclosure is directed to a push notification system (PNS) for sending notifications to users of an application ("app"), e.g., a mobile app of a social networking application. The PNS generates a compact filter data structure ("filter") to store a representation of token identifications ("IDs") of app installations that belong in a specified category. A token ID uniquely identifies a device-app pair. To send a notification, the PNS identifies the filter corresponding to the specified category, tests the filter with token IDs of all installations of the app to identify which of the token IDs are present in the filter, and sends the notification to client devices associated with the identified set of token IDs. The filter facilitates a fast lookup of a token ID while consuming significantly less storage space, e.g., as the filter stores a representation of the token IDs and not the actual token IDs.

20 Claims, 7 Drawing Sheets

COMPACT DATA STRUCTURES FOR PUSH NOTIFICATIONS

BACKGROUND

"Push technology" is a type of Internet-based communication in which information transmission is initiated by a "publisher" or a server computing device ("server"). It is contrasted with "pull technology" in which the request for information transmission is initiated by a receiving client computing device ("client"). Services with push technology can offer to clients push services. Push services are sometimes based upon information preferences expressed in advance. For example, a client might subscribe to one or more information "channels." The server associated with the channels can then push information to the client when new content associated with the channel becomes available. Some push services also identify users that may be interested in receiving information regarding particular channels based on an observed user behavior or stated interests of the users. For example, a social networking application can infer from user interactions with a social network service, such as posts, pictures, comments, posts or pages liked by the users, geographical location, age, sex marital status of the users, a channel the users may be interested in and send content from the channel as notifications to clients associated with those users.

Regardless of how the users are identified for receiving the notifications, the server has to maintain a list of the users who are interested in a specific channel. For example, the server may have to store user identifications ("IDs") of all users interested in a particular channel in a data structure. Maintaining such lists of users can be resource intensive, e.g., especially in a social networking application used by many millions or even billions. For example, such lists can consume a significantly large storage space. If the users have installed a mobile application ("app") of the social networking application at multiple clients, the server may also have to store client device information for each of these clients in the lists, which further increase the storage space consumed.

When a notification is to be sent to the users interested in a particular channel, the server may have to retrieve the user IDs, and in some cases client IDs if the notifications have to be sent to only some of the clients associated with the users. Obtaining the IDs from such large lists can be resource intensive, and therefore can cause a delay in sending the notifications to the users.

Further, the lists may have to be continually updated to reflect changes in user behavior or subscriptions, which can also consume significant computing resources. Some or all of the above problems may increase exponentially with the number of lists that are to be maintained for different users that may be interested in different channels.

DETAILED DESCRIPTION

Embodiments are disclosed for a push notification system for sending notifications to users of an application ("app"), e.g., a mobile app. A mobile app is an app that executes at a mobile computing device, e.g., a "smartphone," tablet computing device. The app can be installed at one or more client computing devices ("client devices"), e.g., mobile or other computing devices. In some embodiments, the app is a social networking application. The push notification system can send or target notifications to a set of installations of the app (also referred to as "push targets"). Each installation of the app can be identified using a token identification ("ID"), which uniquely identifies a client device-app pair, e.g., an installation of the app on a specified client device. The push notification system can send a notification to all installations of the app or a subset of the installations that belong in a specified category. In some embodiments, the push notification system determines that an installation belongs in the specified category if one or more attributes of a user and/or a client device associated with the installation satisfy a criterion associated with the specified category.

The push notification system facilitates sending notifications to the identified push targets in an efficient manner, e.g., by consuming fewer computing resources and less storage space of the push notification system. In some embodiments, the push notification system achieves this result by using a filter data structure ("filter") that facilitates a quick and efficient lookup of a key, e.g., a token ID of an installation of the app, in the filter to determine whether the installation of the app is one of the push targets while consuming significantly less storage space for storing the keys in the filter. Because the filter consumes significantly less storage space, one of the advantages is that the filter can be stored in a memory device, e.g., random access memory (RAM), of the push notification system to further minimize the time consumed in performing a lookup for the key.

The push notification system can store a representation of the token ID of the installation in the filter, instead of the actual token ID. The representation format can be chosen such that the storage space consumed in storing the representations of a specified number of token IDs is significantly less than that consumed in storing the specified number of token IDs and the time taken to perform a look up for the token ID is minimal. In some embodiments, the representation is generated using a one-way function, e.g., the representation can be generated based on the token ID, but the token ID cannot be derived back from the representation. That is, one cannot reverse engineer a token ID from the representation of the token ID. In some embodiments, this is useful because only a portion of the token ID is stored, thereby minimizing the storage space consumed.

In some embodiments, a filter data structure that supports storing such representations includes a Bloom filter data structure. A Bloom filter can be a space-efficient probabilistic data structure that is used to test whether a key is a member of a set. A query to the Bloom filter for a particular key returns either a "possibly in set" or "definitely not in set". The keys, e.g., a representation of the keys, can be added to the bloom filter, but may not be retrieved. In some embodiments, a Bloom filter is a bit array of m bits, all set to "0," and has k different hash functions, each of which maps or hashes some specified key to one of the m array positions with a uniform random distribution. When a key is added to the Bloom filter, the hash functions determine one or more bit positions for the key and set them to "1." To query for a key (test whether it is in the set), the key is fed to each of the k hash functions to get k array positions. If any of the bits at these positions is 0, the key is definitely not in the set—if the key were in the set, then all the bits at these positions would have been set to 1 when it was inserted. The number m can be determined as a function of the number of keys to be stored in the Bloom filter, and once determined, the size of the Bloom filter does not change irrespective of how many keys are stored in the Bloom filter. Note that the disclosed embodiments are not restricted to a Bloom filter. The disclosed embodiments can be implemented using various other filters that provide at least the above discussed efficiency advantages, e.g., look-up speed and minimal storage space consumption.

The push notification system can store, in the filter, the token IDs, e.g., a representation of the token IDs, of the installations that belong in the specified category. When the push notification system receives a request for sending a notification to the push targets, e.g., from the app, the push notification system can retrieve all the token IDS from an associated storage system, e.g., a database, and query the filter to determine whether each of the retrieved token IDs is present in the filter. If the push notification system determines that the token ID is present in the filter, it determines that the app installation corresponding to the token ID belongs in the specified category, and sends the notification to the push target, e.g., a client device associated with the token ID. Similarly, the push notification system sends the notification to client devices associated with all of the token IDs that are present in the filter.

In some embodiments, the notification can include various types of information. For example, the notification includes information regarding a particular topic of interest to the users. In another example, the notification can be a score of a game that the users are interested in. In yet another example, the notification can be a reminder for watching an upcoming television program.

The push notification system can send different notifications to different sets of push targets. For example, the push notification system can be configured to send a first notification to a first set of push targets, which includes users interested in baseball, and a second notification to a second set of push targets, which includes users interested in basketball. Different categories can have different sets of push targets. For example, a first category which includes users interested in baseball can have a first set of push targets, and a second category, which includes users interested in basketball, can have a second set of push targets. In some embodiments, the push notification system generates separate filters for different categories, and stores a set of push targets belonging to a specified category in the corresponding filter. For example, the push notification system generates a first filter corresponding to the first category to store the token IDs of the installations that satisfy a criterion associated with the first category, and a second filter corresponding to the second category to store the token IDs of the installations that satisfy a criterion associated with the second category.

The specified category can be associated with a criterion that determines a set of installations to be included in the specified category. The criterion can be based on one or more attributes, e.g., user attributes, client device attributes. The user attributes can include information associated with a user of the app, e.g., user ID, gender, age, location, topic of interests of the user, posts, pictures and/or comments posted by the user, posts liked by the user. The client device attributes can include client device related information, e.g., a type of the client device—a laptop, a smartphone, a tablet, a wearable device, etc.; an operating system of the client device, a location of the device, form factor of the client device, display screen resolution of the device, etc. For example, a criterion can indicate to include users who are interested in basketball, have smartphones that are of a specified operating system and are living in the United States of America in the specified category. All the installations that satisfy the above criterion are considered belonging to the specified category.

The push notification system can determine the token IDs of the installations that belong in the specified category by executing a query corresponding to the specified category. When the query corresponding to the specified category is executed, the query can retrieve token IDs of the app installations that belong in the specified category. The push notification system can then populate the filter corresponding to the specified category with the retrieved token IDs. In some embodiments, the app inputs the query to the push notification system. In some embodiments, the query identifies the users who are interested in basketball using a variety of information. For example, the push notification system can analyze the user profile, posts, comments, likes, pictures, etc. to identify any indicators that indicate the user may be interested in basketball. In some embodiments, the app can itself identify the users and/or client devices. In some embodiments, the app can provide the logic to identify the users to the push notification system.

The push notification system can populate the filter with the token IDs as part of a scheduled job. The push notification system can also populate the filter based on a trigger condition, which can include an update to user information database, a receipt of a request from the app to populate the filter, etc. In some embodiments, when the user information database is updated, e.g., to add new users, change user attributes, the push notification system can execute the query associated with the specified category to determine whether any new token IDs, e.g., corresponding to the installations that belong in the specified category, have to be added to the filter, or any existing token IDs have to be removed. The push notification system typically populates the filter prior to receiving a request to send the notification to the push targets, and not upon receiving the request. When the request is received, the push notification system performs a look up in the filter to determine the token IDs that are present in the filter and sends the notifications to the client devices corresponding to those token IDs. The process of a looking up in a filter, which can typically be in-memory, is more efficient, e.g., faster, compared to the slow and resource intensive process of executing the query, which typically involves reading a significant amount of data from a slow secondary storage device. By eliminating the execution of the query after receiving the request, the time consumed in reading a significant amount of data from the slow secondary storage device is eliminated, and therefore, the delay caused in sending the notifications to the identified set of push targets is minimized.

Figure 1:
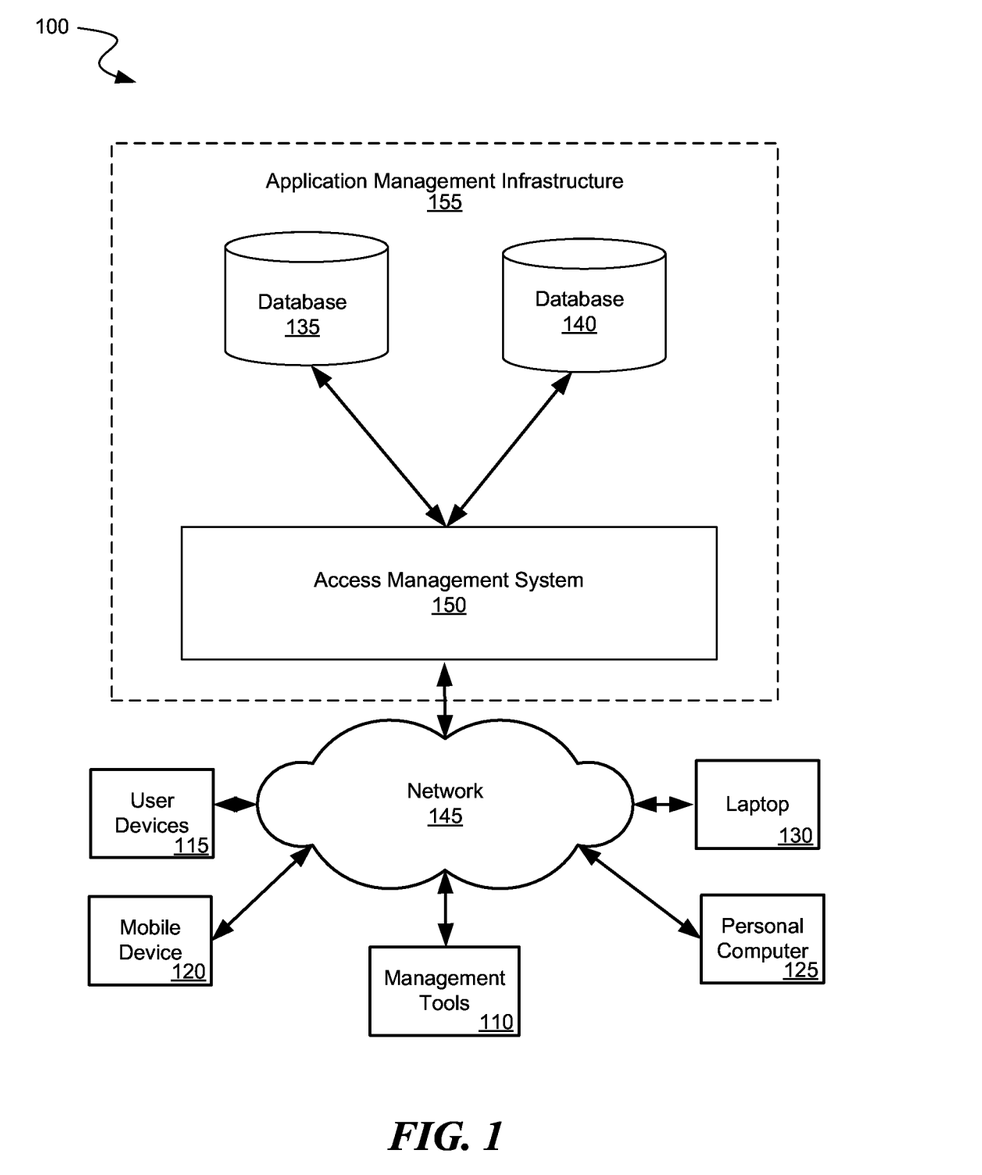
FIG. 1 is a block diagram illustrating an environment in which the disclosed embodiments may be implemented.

Turning now to the figures, FIG. 1 depicts a block diagram illustrating an environment 100 in which the disclosed embodiments may be implemented. Companies can generate and store a tremendous amount of data (e.g., photographs, messages, e-mails, electronic documents, or healthcare records) and related analytics (e.g., usage analytics). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. In some embodiments, an application, e.g., a social networking application, can be implemented using the application management infrastructure 155 that the users can access to perform various activities, e.g., social networking activities. The users can access the application from user devices associated with the users via the access management system 150.

User device 115 can be any computing device capable of receiving user input as well as transmitting and/or receiving data via the network 145. The user device 115 can be a conventional computer system, such as a desktop 125 or a laptop computer 130, a mobile device 120, a smartphone, a wearable device, a tablet, or a similar device. The user device 115 is configured to communicate with access management system 150 and/or the financial account provider via the network 145. The user device 115 can access the social networking application in one or more ways. For example, the user device 115 can execute a browser application to enable interaction between the user device 115 and access management system 150 via the network 145. In another example, the user device 115 executes a client portion of the social networking application, e.g., a mobile app, allowing a user of the user device 115 to interact with the access management system 150 to access the social networking application. In another embodiment, the user device 115 interacts with the access management system 150 through an application programming interface (API) that runs on the native operating system of the user device 115, such as iOS® or ANDROID™.

The user devices 115 can be configured to communicate via the network 145, which may comprise any combination of local area and/or wide area networks, using both wired and wireless communication systems. In some embodiments, the network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
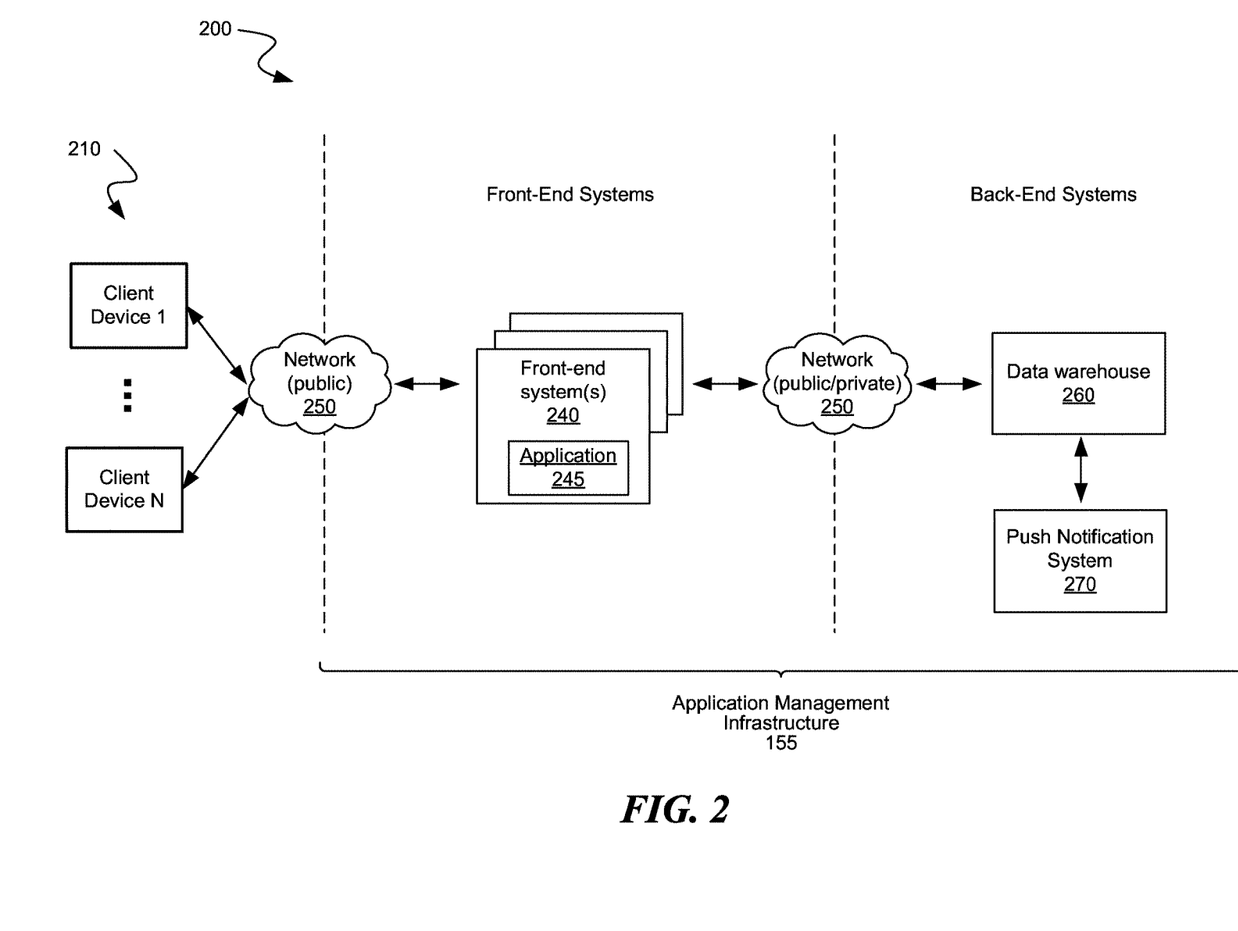
FIG. 2 is a block diagram illustrating a more detailed example of the application management infrastructure of FIG. 1, consistent with various embodiments.

FIG. 2 depicts a block diagram illustrating a more detailed example 200 of the application management infrastructure 155 of FIG. 1, consistent with various embodiments. The application management infrastructure 155 can include various front-end systems and back-end systems that can be physically and/or functionally distributed. As illustrated, the application management infrastructure 155 includes front-end systems, e.g., a front-end system 240, a back-end data warehouse 260, and a push notification system 270. In some embodiments, the front end systems and the back end systems can collectively comprise the access management system 150 of FIG. 1. The client devices or user devices 210 can be configured to communicate via the network 250 with the front-end system 240, the front-end system 240 can be configured to communicate with the client devices 210 and the back-end data warehouse 260 via the network 250, and the back-end data warehouse 260 can be configured to communicate with the front-end system 240 and a push notification system 270 via the network 250. In some embodiments, the client devices 210 are similar to the user devices 115 of FIG. 1.

The front-end system 240 can host an application 245, e.g., a social networking application, that can be accessed by users using their associated client devices 210. In some embodiments, a portion of the application 245 is installed on the client devices 210, e.g., as a mobile app. The front-end system 240 can comprise various operational systems, e.g., server computing devices, and/or relational databases. The operational systems are typically optimized for preservation of data integrity and speed of recording transactions through use of database normalization and an entity-relationship model. Fully normalized database designs often result in information being stored in hundreds or even thousands of tables. Relational databases are efficient at managing the relationships between these tables. The databases have very fast insert/update performance because only a small amount of data in those tables is affected each time a transaction is processed. For performance and other purpose, older data is periodically purged from the front-end operational system 240 to the data warehouse 260.

The data warehouse 260 is a "functionally" central repository for data that is purged from multiple front-end (operational) systems 240. The data warehouse 260 is "functionally" central because it can be physically and/or functionally distributed. For example, the data warehouse 260 can include a user space for server logs associated with user data that can be sharded, e.g., partitioned, across any number of physical distributed machines. In some embodiments, the back-end data warehouse 260 stores various user profile data, data of client devices 210, app installation data, which can include a token ID of the app installation, an operating system of the client device associated with the token ID, etc. The data warehouse 260 can store current as well as historical data. For example, the back-end data warehouse 260 can store historical user data that is ten years or older. The data warehouse 260 is commonly used for operational and development purposes including, but not limited to, data analysis.

The data warehouse 260 may take a variety of forms. In some embodiments, the data warehouse 260 is configured as a distributed file storage system, e.g., Hadoop distributed file storage (HDFS).

The push notification system 270 facilitates sending a notification to a set of users of the app 245 at one or more of their client devices. The push notification system 270 can send the notification as in-app notification, an email, a text message, or as any other communication to one or more of the client devices 210 of the users.

Figure 3:
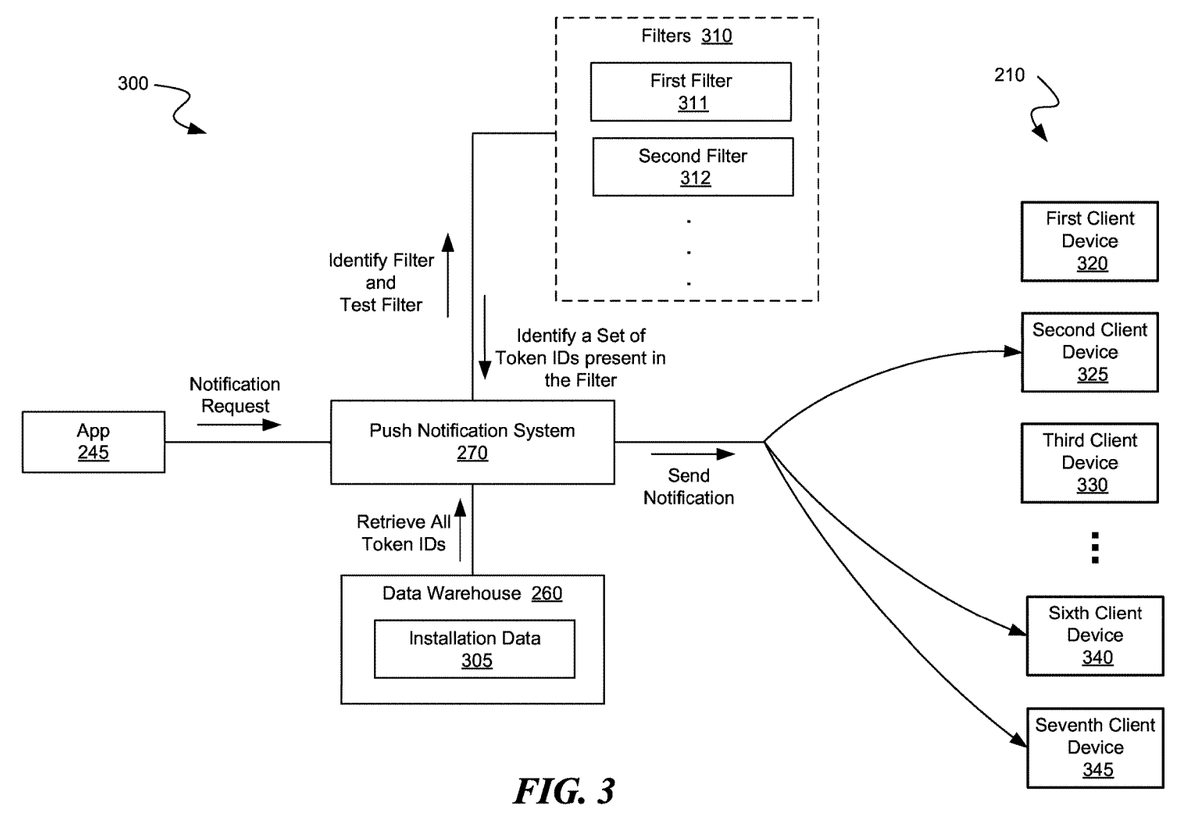
FIG. 3 is a block diagram of an example of sending notifications to a set of push targets, consistent with various embodiments.

FIG. 3 is a block diagram of an example 300 of sending notifications to a set of push targets, consistent with various embodiments. In some embodiments, the example 300 can be implemented using the push notification system 270 of FIG. 2. The app 245 can send a notification to the users of the app 245. The notification can include a variety of information, e.g., weather information, score of teams in a game, a news update, a reminder for an event, etc. The app 245 can target the notifications to all or some of the users, further yet, to some or all of the client devices 210 of a user. Accordingly, the app 245 identifies a set of installations of the app 245 as the set of push targets to which the notifications are to be sent. Each of the installations of the app has an associated user of the app and an associated client device on which the app is installed. The app 245 can be installed on a number of client devices 210 e.g., a first client device 320, a second client device 325, a third client device 330, a sixth client device 340, a seventh client device 345.

The data warehouse 260 stores installation data 305 of the app 245, which includes a variety of information regarding installations of the app 245. For example, the installation data 305 includes a token ID of each installation of the app. The token ID uniquely identifies a client device-app pair, e.g., a specified client device on which a specified instance of the app is installed. For example, if the app is installed on fifty client devices, a particular token ID can identify a specified client device of the fifty client devices on which the particular instance of the app is installed. In some embodiments, the push notification system 270 can obtain an address of the client device using the token ID and then send the notification to the client device based on the address. The installation data 395 can also include a type of operating system of the client device associated with the token ID.

The push notification system 270 has a number of filters 310, e.g., a first filter 311 and a second filter 312, wherein each filter identifies a set of push targets that belong in a corresponding category. For example, the first filter 311 identifies a first set of push targets that belong in a first category, which includes users to whom a first notification associated with the first category, e.g., a notification regarding basketball game, is to be sent. A category can be associated with a criterion, which an installation, e.g., users or client devices associated with the installations, has to satisfy to belong in the category. For example, the app 245 may define the criterion to belong in the first category as a set of users in a particular country who are interested in baseball. Further, the app 245 can also specify that the notification is to be sent to the users having a client device that is executing a particular operating system. The notification sent to the first set of push targets can include information about live streaming details of a basketball match. Continuing with the above example, the second filter 312 identifies a second set of push targets that belong in a second category. The app 245 may define the second category to include a set of users in a particular country who are interested in baseball. In some embodiments, the app 245 provides a query, which the push notification system 270 can execute to identify the set of installations that belong in the specified category.

In some embodiments, the push notification system 270 stores token IDs of the push targets, e.g., token IDs of the installations that belong in the specified category in a filter that corresponds to the specified category. For example, the first filter 311 stores the token IDs of the installations that belong in the first category. The first filter 311 may store a representation of the token IDs and not the actual token IDs, e.g., to conserve storage space and/or facilitate a fast look up. Accordingly, in some embodiments, the push notification system 270 may only be able to test whether or not a particular token ID is in the filter, but may not be able to retrieve the token IDs from the first filter 311. Further, the push notification system 270 may store some or all of the filters 310 in a memory, e.g., RAM, of the push notification system 270.

When the push notification system 270 receives a request from the app 245 to send a notification to a set of push targets, the push notification system 270 identifies the filter to be used, e.g., the first filter 311, for determining the set of push targets, based on the category specified in the request. After identifying the first filter 311, the push notification system 270 retrieves all token IDs associated with the app installations from the installations data 305, and queries the first filter 311 to determine if each of the retrieved token IDs is present in the first filter 311. If the token ID is present in the first filter 311, then the installation associated with the token ID is identified as a push target. On the other hand, if the token ID is not present in the first filter 311, the installation associated with the token ID is not a push target. After identifying all the token IDs, the push notification system 270 determines the addresses of the client devices based on the associated token IDs and sends the notification to the identified client devices, e.g., the second client device 325, the sixth client device 340 and the seventh client device 345. The push notification system 270 can send the notifications to the identified client devices simultaneously or sequentially.

The various component, functions, and or tools that can be associated with and/or included within the push notification system 270 are discussed in greater detail with reference to FIG. 4 below.

Figure 4:
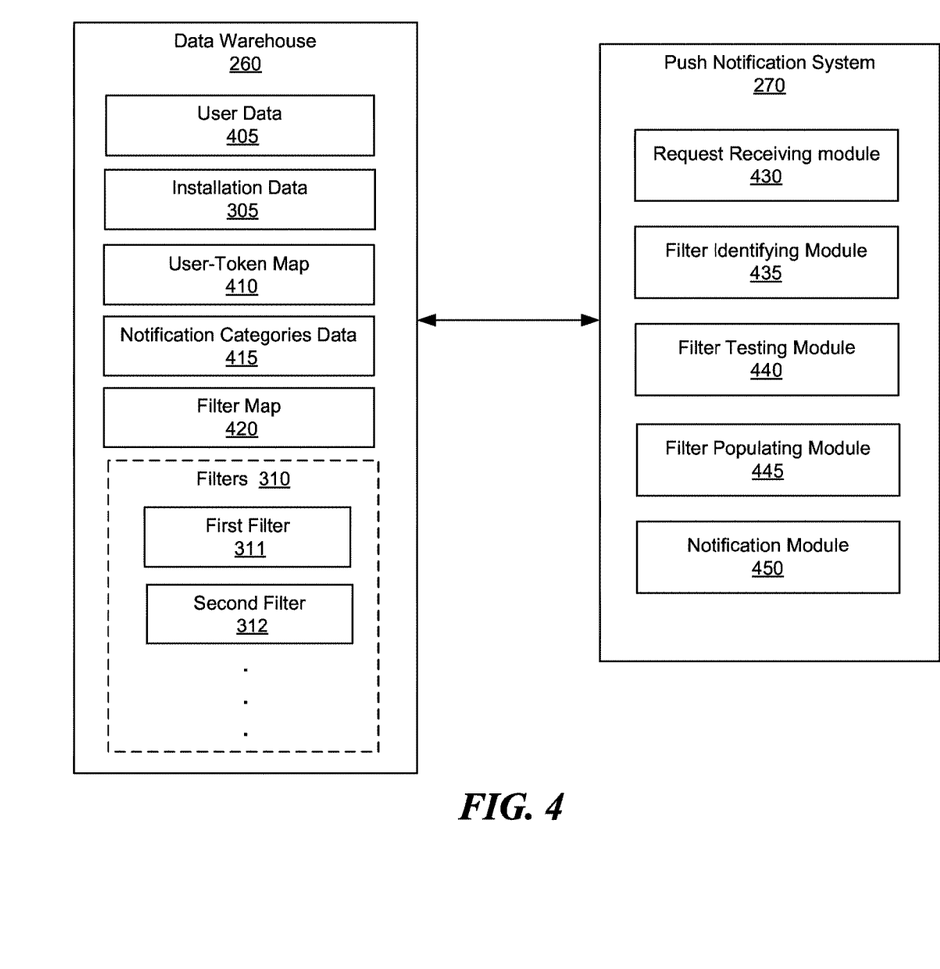
FIG. 4 is a block diagram of the back end systems of FIG. 2, consistent with various embodiments.

FIG. 4 is a block diagram of the back end systems of FIG. 2, consistent with various embodiments. The data warehouse 260 stores a variety of information associated with the app 245 of FIG. 2. For example, the data warehouse 260 includes user data 405, the installation data 305, user-token map 410, notification categories data 415, a filter map 420 and the set of filters 310. The above data can be stored in a single database, e.g., database 135, in the data warehouse 260, or some or all of these data can be distributed across various databases, e.g., databases 135 and 140 in the data warehouse 260.

The user data 405 can include a variety of information regarding the users of the app 245. The user attributes can include any attribute that can describe a user of the app, e.g., user ID, gender, age, geographical location, marital status, topic of interests of the user, posts, pictures and/or comments posted by the user, posts liked by the user.

The installation data 305 can include information regarding installations of the app 245, as described at least with reference to FIG. 3. Apart from the token ID, the installation data 305 can also include attributes describing a client device at which the app is installed, e.g., a type of the client device—a laptop, a smartphone, a tablet, a wearable device, etc.; an operating system of the client device, a location of the client device, a form factor of the client device, a display screen resolution of the client device, etc.

The data warehouse 206 can include a user-token map 410 that includes a mapping of the user ID and the token IDs associated with the user ID. That is, the mapping can map the user ID of a specified user with token IDs of all the installations of the app 245 on the client devices associated with the specified user. For example, if the specified user has installed the app 245 on five of the user's client devices, then the user ID of the specified user can be mapped to the five token IDs corresponding to the five installations of the app 245. The user-token map 410 may be used to retrieve, given a user ID of the specified user, all the installations associated with the specified user.

The data warehouse 260 includes notification categories data 415, which includes various notification categories and criterion associated with each of those notification categories that can be used to identify a set of push targets that belong in the corresponding notification category. For example, the app 245 may intend to send a notification regarding basketball game updates to a first set of push targets that belong in a first notification category. The criterion associated with the first notification category may indicate to include a set of users in a particular country who are interested in basketball. Further, the criterion can also specify that the notification is to be sent to users having client devices that are executing a particular operating system. The push notification system 270 can use the criterion associated with the first notification category to identify the set of installations that belong in the first notification category. In some embodiments, the app 245 provides a query associated with the criterion, which the push notification system 270 can execute to identify the set of installations that belong in the specified category. The push notification system 270 can also store the query with the associated notification category. The notification categories data 415 can include several such notification categories defined by the app 245. In some embodiments, the push notification system 270 assigns a unique ID to each category stored in the notification categories data 415.

The data warehouse 260 stores a number of filters 310 generated by the push notification system 270. Each of the filters corresponds to one of the notification categories stored in the notification categories data 415 and identifies a set of push targets that satisfies a criterion of the corresponding notification category, e.g., as described at least with reference to FIG. 3. The push notification system assigns a unique ID to each of filters 310 that uniquely identifies a filter. In some embodiments, the push notification system 270 stores token IDs of the installations that belong in a specified category, in the corresponding filter. For example, the first filter 311 stores the token IDs of the installations that belong in the notification category to which the first filter 311 corresponds.

In some embodiments, the first filter 311 stores a representation of the token IDs and not the actual token IDs, e.g., to conserve storage space and/or facilitate a fast look up of the token IDs. Accordingly, in some embodiments, the push notification system 270 may only be able to test whether or not a particular token ID is in the filter, but may not be able to retrieve the token IDs from the first filter 311. Further, the push notification system 270 may store some or all of the filters 310 in a memory, e.g., RAM, of the push notification system 270.

In some embodiments, the filters 310 can be generated using compact data structures such as a Bloom filter data structure. A Bloom filter facilitates in testing whether a token ID is a member of a set. A query to the Bloom filter for a particular token ID returns either a "possibly in set" or "definitely not in set". The token IDs, e.g., a representation of the token IDs, can be added to the Bloom filter, but may not be retrieved. In some embodiments, an empty Bloom filter is a bit array of m bits, all set to "0," and has k different hash functions, each of which maps or hashes a token ID to one of the m array positions with a uniform random distribution. When a token ID is added to the Bloom filter, the hash functions determine one or more bit positions for the token ID and set them to "1." When the Bloom filter is queried for a specified token ID, e.g., tested whether the specified token ID is in the set, the specified token ID is fed to each of the k hash functions to get k array positions. If any of the bits at these positions is "0," the specified token ID is definitely not in the filter—if the token ID were in the filter, then all the bits at these positions would have been set to "1" when the specified token ID was inserted.

The size of the Bloom filter, e.g., number of bits "m" in the Bloom filter, can be determined as a function of the number of token IDs intended to be stored in the Bloom filter. Bloom filters have a significant space advantage over other data structures, e.g., data structures that require storing the keys themselves, as Bloom filters do not store the actual keys, but only a representation of the keys. For example, as described above a specified token ID is stored as one or more bits set to "1" at specified positions. Further, once the Bloom filter of a specified size is generated, the storage space consumed by the Bloom filter does not vary with the number of token IDs being added to the Bloom filter. That is, once the Bloom filter of a specified size is generated, the storage space consumed by the Bloom filter does not change irrespective of how many keys are stored in the Bloom filter.

The Bloom filter also provides time advantages over other data structures. In some embodiments, the time needed either to add keys or to check whether a key is in the set is a fixed, and independent of the number of keys stored in the filter.

Note that the disclosed embodiments are not restricted to a Bloom filter. The disclosed embodiments can be implemented using various other such filters that provide at least the above discussed storage and/or time advantages.

The data warehouse 260 also includes a filter map 420 that stores a mapping of a filter to a notification category to which the filter corresponds. For example, the filter map 420 can store a mapping of a filter ID, which is a unique ID assigned to a filter, to a notification category ID, which is a unique ID assigned to a notification category, of the notification category to which the filter corresponds.

The push notification system 270 includes a request receiving module 430 that receives a request from the app 245 for sending a notification to a set of push targets. In some embodiments, the request can include the information to be sent via the notification and one or more of the notification category ID, the filter ID, or any other information that can be used to identify the filter using which the push notification system 270 can identify the set of push targets.

The push notification system 270 includes a filter identifying module 435 that identifies a filter, e.g., one of the filters 310, to be used for identifying the set of push targets to which the notification is to be sent. As described above at least with reference to FIG. 3, the push notification system 270 generates a filter for each of the notification categories. In some embodiments, the filter identifying module 435 identifies the filter based on the information in the request, e.g., filter ID, notification category ID, received from the app 245. For example, if the app 245 sends a notification criterion ID in the request, the filter identifying module 435 can obtain the corresponding filter ID using the filter map 420.

The filter testing module 440 checks whether a given token ID is present in the filter, e.g., the filter identified by the filter identifying module 435. The filter testing module 440 retrieves all the token IDs from the installation data 305 and tests the filter to determine whether each of the token IDs is present in the filter. If the filter indicates that a particular token ID is present in the filter, the installation associated with token ID is identified as a push target. If the filter indicates that a particular token ID is not present in the filter, the installation associated with token ID is not identified as a push target.

The notification module 450 sends the notification to all the installations, e.g., client devices associated with token IDs of the installations, identified as the push targets by the filter testing module 440. The notification can include any information provided by the app 245, e.g., weather information, score of teams in a game, a news update, a reminder for an event. The notification module 450 can send the notification as in-app notification, an email, a text message, or as any other communication to one or more of the client devices that are identified by the token IDs. The notification module 450 can send the notifications to the identified client devices simultaneously or sequentially.

The filter populating module 445 can generate a filter for a specified notification category and add the token IDs of the installations corresponding to the users and/or client devices that satisfy a criterion of the specified notification category. In some embodiments, the filter populating module 445 populates the filter by executing a query associated with specified notification category with which the filter is associated. In some embodiments, the query can return a set of users who satisfy the specified notification category, but not the token IDs of the installations associated with the set of the users. The filter populating module 445 can use the user-token map 410 to obtain the token IDs associated with each of the set of users.

The filter populating module 445 can populate the filter with the token IDs as part of a scheduled job. The filter populating module 445 can also populate the filter based on a trigger condition, which can include an update to user data 405, a receipt of a request from the app 245 to populate the filter, etc. In some embodiments, when the user data 405 is updated, e.g., to add new users, change user attributes of existing users, or when installation data 305 is updated to add a new installation of the app on a new client device or to change the existing installation data when the app state changes on a client device, the filter populating module 445 can execute the query associated with the specified category to determine whether any new token IDs, e.g., corresponding to the installations that belong in the specified category, have to be added to the filter, or any existing token IDs have to be removed.

Figure 5:
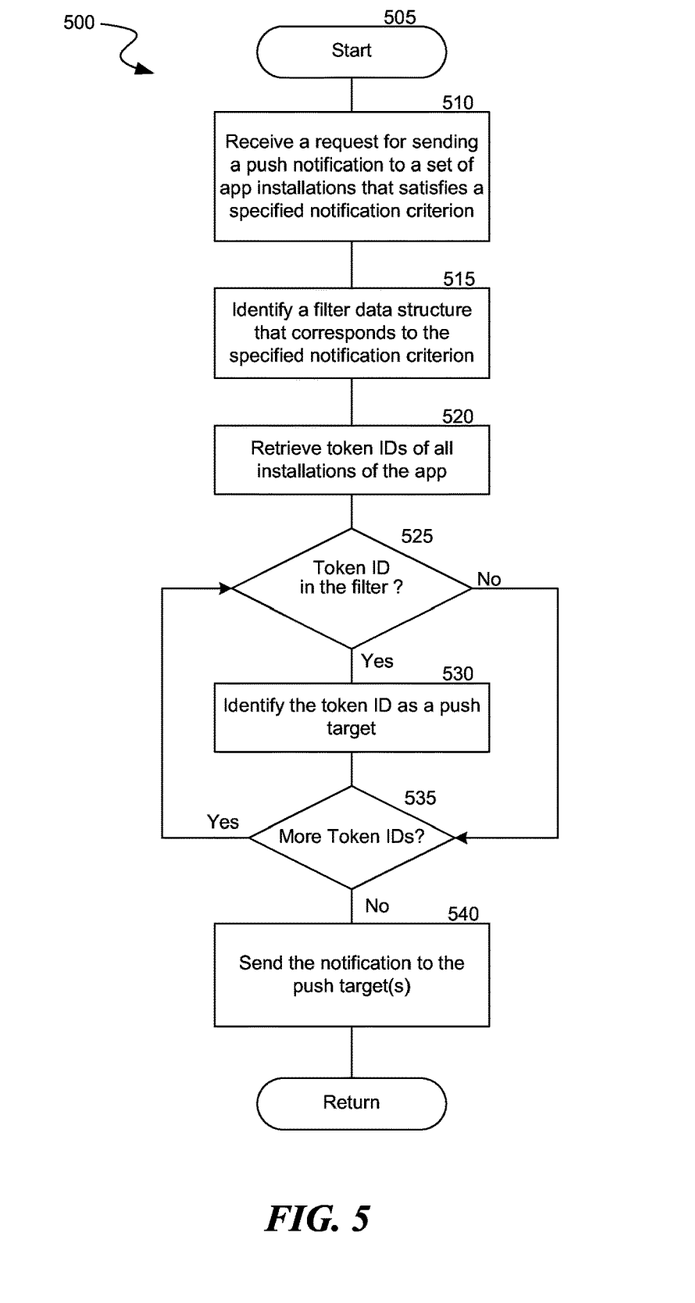
FIG. 5 is a flow diagram of a process of sending a notification to a set of push targets, consistent with various embodiments.

FIG. 5 is a flow diagram of a process 500 of sending a notification to a set of push targets, consistent with various embodiments. In some embodiments, the process 500 may be implemented using the push notification system 270. The process 500 begins at block 505, and at block 510, the request receiving module 430 receives a request for sending a notification to a set of app installations that belong in a specified notification category. In some embodiments, the request can include the information to be sent in the notification and one or more of the notification category ID or the filter ID using which the push notification system 270 can identify the set of push targets.

At block 515, the filter identifying module 435 identifies the filter corresponding to the specified notification category. In some embodiments, the filter identifying module 435 identifies the filter based on the information in the request, e.g., filter ID, notification category ID. For example, if the request includes a notification category ID, the filter identifying module 435 can obtain the corresponding filter ID using the filter map 420.

At block 520, the filter testing module 440 retrieves the token IDs of all installations of the app 245, e.g., from the installations data 305. At determination block 525, the filter testing module 440 tests the filter to determine whether or not a token ID from the retrieved list of token IDs is present in the filter. If the filter determines that the token ID is present in the filter, at block 530, the filter testing module 440 identifies the installation associated with the token ID as a push target. On the other hand, if the filter determines that the token ID is not present in the filter, the filter testing module 440 does not identify the installation associated with the token ID as a push target and the process 500 proceeds to determination block 535.

At determination block 535, the filter testing module 440 determines if there are any more token IDs in the retrieved list. If there are more token IDs in the retrieved list, the process 500 continues to determination block 525 to determine if the next token ID from the list is in the filter. On the other hand, if there are no more token IDs in the retrieved list, at block 540, the notification module 450 sends the notification to the identified push targets, e.g., client devices associated with the token IDs present in the filter.

Figure 6:
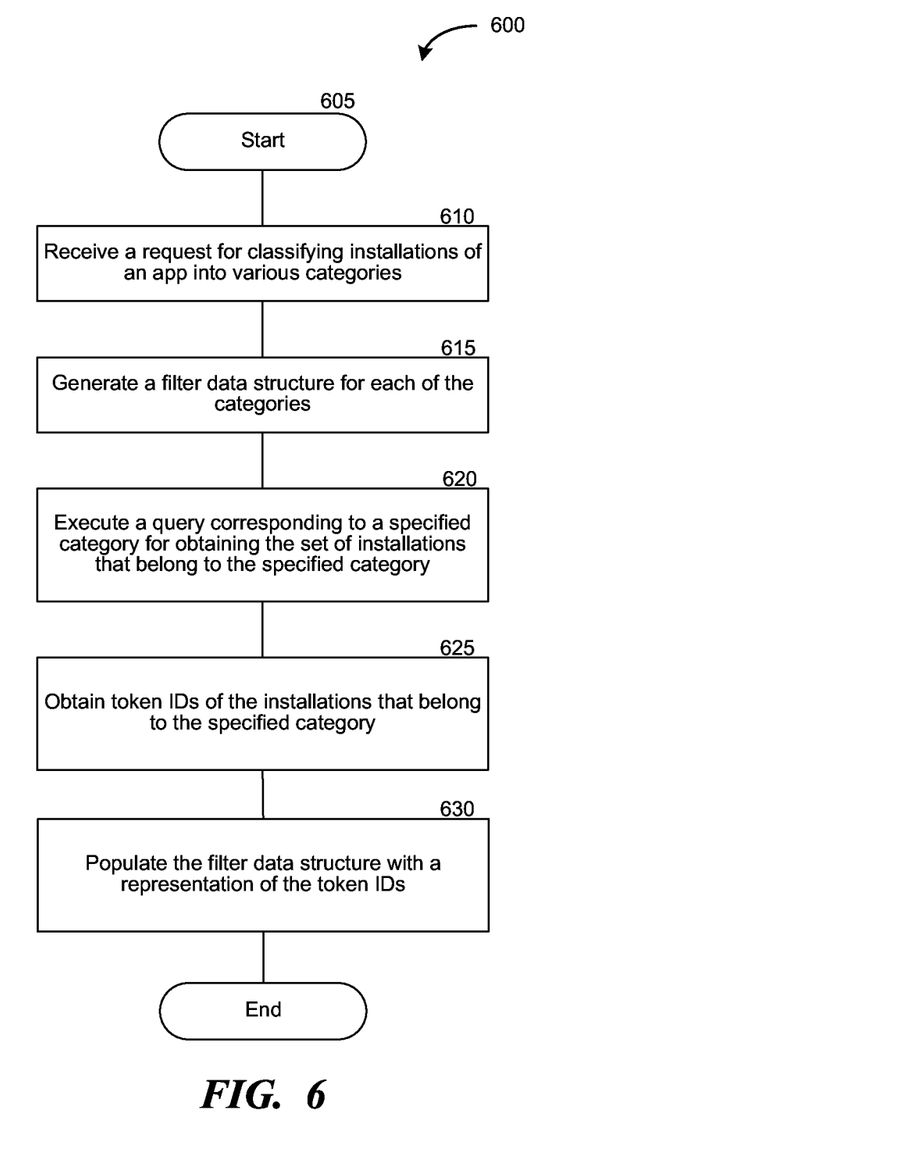
FIG. 6 is a flow diagram of a process of classifying installations of the app into multiple categories, consistent with various embodiments.

FIG. 6 is a flow diagram of a process 600 of classifying installations of the app into multiple categories, consistent with various embodiments. In some embodiments, the process 600 may be implemented using the push notification system 270. The process 600 begins at block 605, and at block 610, the filter populating module 445 receives a request for classifying the installations of the app into various notification categories. In some embodiments, each category includes a set of push targets that are intended to receive notifications associated with the corresponding category. For example, a first category is intended to include a set of users who would receive notifications regarding a basketball game, and a second category is intended to include a set of users who would receive notifications regarding a baseball game.

At block 615, the filter populating module 445 generates a filter for each of the notification categories. At block 620, the filter populating module 445 executes a query associated with a specified category that identifies a set of installations that satisfy a criterion associated with the specified category. In some embodiments, the filter populating module 445 can obtain the query from the notification categories data 415 in which the query is stored in association with the specified category.

At block 625, the filter populating module 445 retrieves the token IDs of the installations belonging to the specified category in response to executing the query. At block 630, the filter populating module 445 stores the token IDs, e.g., a representation of the token IDs, in the filter.

Figure 7:
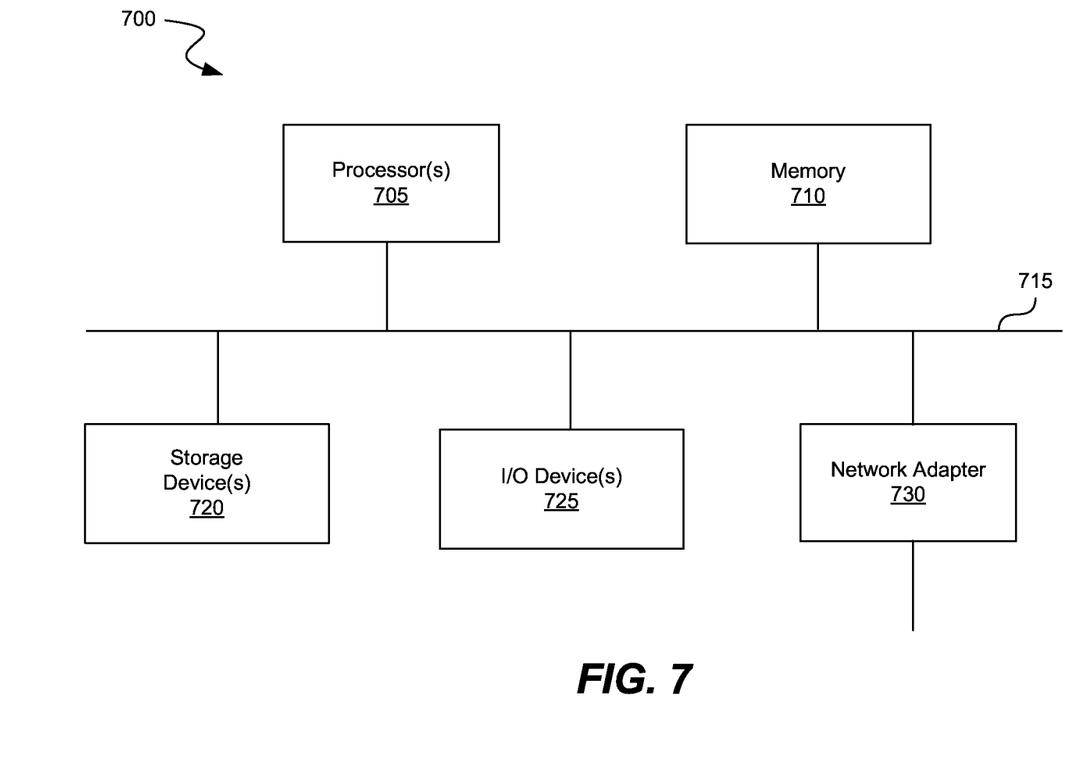
FIG. 7 is a block diagram of a processing system that can implement operations, consistent with various embodiments.

FIG. 7 is a block diagram of a computer system as may be used to implement features of the disclosed embodiments. The computing system 700 may be used to implement any of the entities, components or services depicted in the examples of the foregoing figures (and any other components and/or modules described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving a request for sending a notification to a set of push targets of an application ("app"), the app installed at multiple client devices to generate multiple installations of the app, wherein the installations include a specified installation that is associated with a user of multiple users and a client device of the client devices, the set of push targets including a set of the installations that belongs in a specified category;
   retrieving multiple token identifications (IDs) of the installations from a storage system, wherein the token IDs includes a specified token ID that uniquely identifies a device-app pair;
   identifying a filter data structure that corresponds to the specified category, the filter data structure storing a representation of a set of token IDs of the set of the installations, wherein the filter data structure is of a size that consumes less storage space than that consumed by the set of the token IDs;
   querying the filter data structure to determine whether or not each of the token IDs is present in the filter data structure, the querying resulting in identification of a subset of the token IDs that is present in the filter data structure; and
   sending the notification to the set of push targets, the set of push targets being a set of the client devices associated with installations corresponding to the subset of the token IDs.

2. The method of claim 1, wherein the set of push targets is determined as the set of the installations associated with a set of the users that satisfies a criterion associated with the specified category.

3. The method of claim 1, wherein the set of push targets is determined as is determined as the set of the installations associated with a set of the users and a set of client devices that satisfy a criterion associated with the specified category.

4. The method of claim 1, wherein the specified category identifies a topic of interest to the users.

5. The method of claim 1, wherein querying the filter data structure includes:
   executing, a query in the storage system to identify a subset of the users that satisfies a criterion associated with the specified category,
   obtaining token IDs associated with the subset of the users as the subset of the token IDs, and
   generating the filter data structure to store a representation of at least some of the subset of the token IDs.

6. The method of claim 5, wherein executing the query includes executing the query in response to updating, in the storage system, user data associated with the users and/or installation data associated with the installations.

7. The method of claim 6, wherein updating the installation data includes adding information regarding an installation of the app at specified client device or updating the installation data record when a state of the app is changed at the specific client device.

8. The method of claim 1, wherein the representation of the set of token IDs is generated using a one-way function.

9. The method of claim 1, wherein the filter data structure is one of multiple filter data structures, the filter data structures corresponding to different categories, wherein the filter data structures includes a specified filter data structure that stores a token IDs of a specified set of installations that belong in the a category which the specified filter data structure corresponds.

10. The method of claim 1, wherein sending the notification includes sending the notification to the set of the client devices via the app.

11. The method of claim 1, wherein identifying the filter data structure includes generating the filter data structure of a specified size, the specified size determined as a function of a number of token IDs to be stored in the filter data structure.

12. The method of claim 11, wherein generating the filter data structure of the specified size includes generating the filter data structure in a format whose memory consumption remains constant regardless of a token ID being added to or removed from the filter data structure.

13. The method claim 1, wherein receiving the request includes:
   identifying an occurrence of an event associated with the specified category, and
   sending the notification to the set of push targets in response to the occurrence of the event.

14. A non-transitory computer-readable storage medium storing computer-readable instructions that, when executed by at least one processor of a computing device, cause the computing device to:
   receive a request for classifying multiple installations of an application ("app") to multiple categories for sending a notification associated with a specified category of categories to a specified set of the installations belonging to the specified category, wherein the installations include a specified installation that is associated with a user of multiple users of the app and a specified client device of multiple client devices at which the app is installed;
   generate a filter data structure for each of the categories, wherein the filter data structures includes a specified filter data structure that corresponds to the specified category;
   determine a specified set of the users that satisfies a criterion associated with the specified category;
   determine installations with which the specified set of the users is associated with as the specified set of the installations belonging to the specified category; and
   store a representation of token IDs of the specified set of the installations in the specified filter data structure, wherein the token IDs includes a specified token ID that uniquely identifies a device-app pair that indicates the specified installation on the specified client device, wherein the specified filter data structure is of a size significantly smaller than the size of the token IDs whose representations are stored.

15. The computer-readable storage medium of claim 14, further comprising:
   instructions for receiving a request for sending a notification regarding an event associated with the specified category to the specified set of the installations;
   instructions for retrieving a collection of token IDs of installations of the app from a storage system;
   instructions for determining, using the specified filter data structure, whether or not each of the collection of token IDs is present in the specified filter data structure to obtain the token IDs; and
   instructions for sending the notification to client devices associated with installations corresponding to the token IDs.

16. The computer-readable storage medium of claim 14, wherein the instructions for determining the specified set of users include:
   instructions for obtaining a query corresponding to the criterion associated with the specified category, and
   instructions for executing the first query to obtain the specified set of the users that satisfies the criterion.

17. The computer-readable storage medium of claim 14, wherein the instructions for generating the specified filter data structure include:
   instructions for updating the specified filter data structure in response to a trigger, the updating including determining a specified user who satisfies the criterion and adding a token ID of an installation with which with the specified user is associated to the specified filter data structure.

18. The computer-readable storage medium of claim 17, wherein the trigger includes an expiry of a specified time interval, an update to user data that indicates a change in the user data, or an update to installation data that indicates an addition of a new installation of the app at a new client device or a change in state of an existing installation of the app.

19. A system, comprising:
   a processor;
   a memory comprising instructions that when executed by the processor cause the system to:
   receive a request for sending a notification to a set of push targets of an application ("app"), wherein the app is installed at multiple client devices to generate multiple installations of the app, and wherein the app has multiple users, wherein the set of push targets includes a set of the installations associated with a set of the users that satisfies a specified criterion associated with a specified category;
   identify a filter data structure that corresponds to the specified category, wherein the filter data structure stores a representation of a set of token IDs of installations that belong in the specified category and the filter data structure comprises a compact data structure that consumes less storage space than a data structure storing the set of token IDs;

query the filter data structure to determine whether or not any of multiple token IDs of the installations of the app is present in the filter data structure to identify a subset of the token IDs that is present in the filter data structure; and send the notification to a set of client devices associated with the subset of the token IDs.

20. The system of claim 19, wherein the instructions further cause the system to:

execute, in the storage system, a query corresponding to the specified criterion to obtain the set of the users that satisfy the criterion.

* * * * *

UNITED STATES PATENT AND TRADEMARK OFFICE
CERTIFICATE OF CORRECTION

PATENT NO. : 10,225,357 B2
APPLICATION NO. : 14/939285
DATED : March 5, 2019
INVENTOR(S) : Ittai M. Golde et al.

It is certified that error appears in the above-identified patent and that said Letters Patent is hereby corrected as shown below:

In the Claims

In Column 15, Line 30, Claim 9, delete "the a" and insert -- the --, therefor.

In Column 15, Line 45, Claim 13, delete "method claim" and insert -- method of claim --, therefor.

Signed and Sealed this
Twenty-third Day of April, 2019

Andrei Iancu
*Director of the United States Patent and Trademark Office*